United States Patent [19]

Nixon et al.

[11] Patent Number: 5,015,987

[45] Date of Patent: May 14, 1991

[54] TEMPERATURE SENSING APPARATUS

[75] Inventors: Ronald A. Nixon; Marc A. Peoples, both of Mansfield; Emil R. Plasko, Lexington, all of Ohio

[73] Assignee: Therm-O-Disc, Incorporated, Mansfield, Ohio

[21] Appl. No.: 383,209

[22] Filed: Jul. 21, 1989

[51] Int. Cl.⁵ ............................................. H01C 7/10
[52] U.S. Cl. ................................... 338/22 R; 338/28; 374/185
[58] Field of Search .................. 338/22 R, 22 SD, 25, 338/28, 229; 29/612; 374/185

[56] References Cited

U.S. PATENT DOCUMENTS 4,398,169 8/1983 Hayashi ................................. 338/28
4,586,246 5/1986 Oskoui ............................... 338/28 X Primary Examiner—Marvin M. Lateef
Attorney, Agent, or Firm—Jones, Day, Reavis & Pogue

[57] ABSTRACT

Wires and a thermistor are isolated from the interior surface of a metal tube by a ceramic tube and a ceramic spacer to protect the thermistor and prevent breakdown of insulation on the wires.

10 Claims, 1 Drawing Sheet

U.S. Patent May 14, 1991 5,015,987
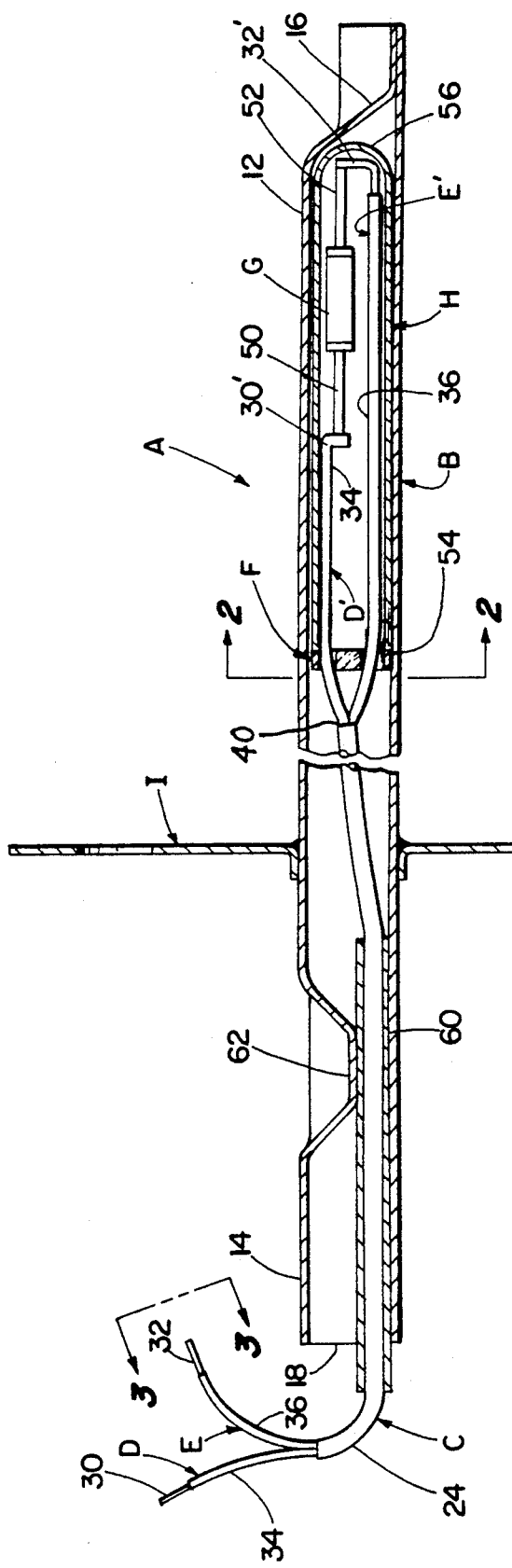
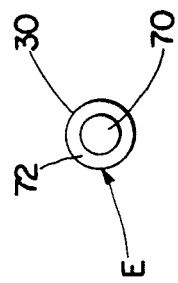
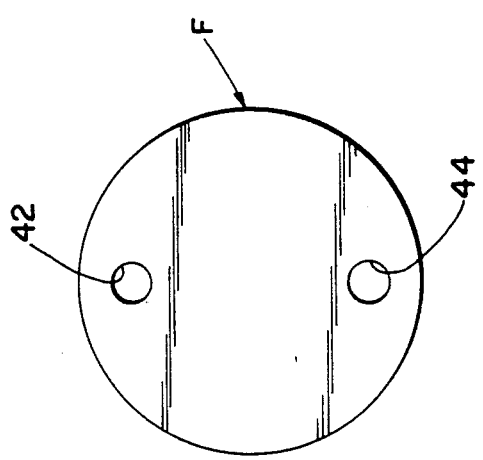

TEMPERATURE SENSING APPARATUS

BACKGROUND OF THE INVENTION

This application relates to the art of temperature sensing and, more particularly, to temperature sensing by use of a probe. The invention is particularly applicable for use in sensing temperatures within a domestic oven for cooking food, and specific mention will be made thereof. However, it will be appreciated that the invention has broader aspects and can be used for sensing temperatures in many other environments.

The normal operating temperature range for domestic cooking ovens is around 25°-250° C. The self-cleaning operating temperature is around 500° C. It would be desirable to use a thermistor for sensing the temperature in both of these ranges. However, existing temperature sensing probes that use thermistors have inadequate protection against wire insulation breakdown at extremely high temperatures. It would be desirable to have a simple and reliable arrangement for protecting the wire insulation against breakdown.

SUMMARY OF THE INVENTION

A temperature sensing probe includes a metal tube receiving a thermistor and a pair of wires that are connected with the thermistor. A ceramic tube is interposed between the thermistor and a portion of the wires for isolating same from the metal tube.

In a preferred arrangement, ceramic spacer means is provided for spacing the pair of wires from one another and from the inner surface of the metal tube.

In a preferred arrangement, the metal tube has a substantially closed end and the ceramic tube has a substantially closed end bottomed out against the closed end of the metal tube.

The pair of wires are stiff, and are cooperatively arranged with the metal tube and ceramic tube for maintaining the ceramic tube bottomed out against the closed end of the metal tube.

A ceramic spacer disc positioned adjacent an open end of the ceramic tube has a pair of holes therethrough receiving the pair of wires for holding same in spaced-apart relationship to one another. The spacer disc also maintains the wires in spaced relationship lying closely adjacent the inner surface of the ceramic tube.

A holding means for holding the stiff wires against longitudinal movement relative to the metal tube is defined by a crimp in the metal tube that clamps the wires against movement.

The ceramic tube and the ceramic disc spacer are preferably a close sliding fit within the metal tube.

It is a principal object of the present invention to provide an improved arrangement for isolating a thermistor and wire insulation from the interior surface of a metal tube.

It is also an object of the invention to provide an improved arrangement for holding a pair of wires in spaced-apart relationship from one another and from the inner surface of a metal tube.

It is another object of the invention to provide an improved temperature sensing device using a thermistor that is capable of use in very high temperature environments.

BRIEF DESCRIPTION OF THE DRAWING

FIG. 1 is a side cross-sectional elevational view of a temperature sensing device constructed in accordance with the present application;

FIG. 2 is a partial cross-sectional elevational view taken generally on line 2—2, and with portions omitted for clarity of illustration; and FIG. 3 is an end elevational view of a wire taken generally on line 3—3 of FIG. 1.

DESCRIPTION OF A PREFERRED EMBODIMENT

Referring now to the drawing, wherein the showings are for purposes of illustrating a preferred embodiment of the invention only and not for purposes of limiting same, FIG. 1 shows a temperature sensing device A having an elongated metal tube B with opposite end portions 12, 14. Metal tube B is preferably of stainless steel and is substantially cylindrical, although other materials and shapes could be used.

Metal tube end portion 12 has a substantially closed end 16 that is provided by crimping the metal tube closed. The other metal tube end portion 14 terminates in an open end 18 through which a duplex wire C enters tube B. Duplex wire C has an outer sheath 24 of woven fiberglass impregnated with a suitable plastic, such as an acrylic.

Within duplex wire sheath 24 are a pair of stiff wires D, E, each of which includes a wire core 30, 32 closely surrounded by a woven fiberglass sheath 34, 36.

Duplex wire insulation sheath 24 is stripped away to a point generally indicated at 40 to provide a pair of individual wire leads D', E' that are extended through a pair of spaced-apart holes 42, 44 in a ceramic spacer disc F. Fiberglass insulation 34, 36 is stripped from the terminal end portions of wire leads D', E' to provide bare wire terminal ends 30', 32' that are welded to leads 50, 52 on a thermistor G.

The assembled wire leads D', E', and thermistor G are then inserted into a ceramic tube H having an open end 54 and a substantially closed end 56. The entire assembly is then inserted into metal tube B through open end 18 thereof. A protective sleeve 60 of acrylic plastic or the like is positioned over duplex wire sheath 24.

While applying a pushing force on wire C to maintain end 56 of ceramic tube H bottomed out against end 16 of metal tube B, a crimp 62 is formed in metal tube B into clamping engagement with sleeve 60 and wire C. Crimp 62 defines a holding means for holding wire C against longitudinal movement relative to metal tube B. The stiffness of wire C maintains tube H substantially bottomed out against end 16 of metal tube B.

Spacer means F maintains wire leads D', E' lying closely adjacent the inner surface of ceramic tube H and extending substantially parallel to such surface.

The force applied to wire C is transmitting through spacer means F to tube H, and this maintains both tube H and spacer means F within metal tube B against longitudinal movement relative thereto.

Mounting means in the form of a flat mounting flange I is secured to metal tube B intermediate its opposite end portions for mounting temperature sensing device A to the wall of an oven or the like. Ceramic tube H extends over a major portion of the length of metal tube B between mounting means I and closed tube end 16. This protects wire leads D', E' over a major portion of their length and aids in maintaining same out of contact with metal tube B in the high temperature area of the tube. Spacer means F is located closely adjacent end 40 of wire sheath 24 where the wires split to form leads D', E'.

FIG. 3 shows a wire 30 having a solid copper core 70 and an outer solid covering of stainless steel 72. The wires may be of different sizes depending upon the application for the temperature sensing device, and have sufficient stiffness to maintain a biasing force on spacer means F and ceramic tube H for holding same against longitudinal movement.

Ceramic tube H and spacer means F are preferably a close sliding fit within metal tube B. Ceramic tube H and spacer means F may or may not have the same cross-sectional shape as metal tube B. For example, if metal tube B is cylindrical, both ceramic tube H and spacer means F can also be cylindrical. However, metal tube B can have other shapes, such as that of an equilateral triangle, while ceramic tube H and spacer means F still have cylindrical shapes. Metal tube H and spacer means F would then be a close sliding fit by making substantially line contact along the three sides of the triangle.

Crimp 62 and spacer means F can be considered cooperating means between metal tube B and wire C, and between ceramic tube H and wire C, for maintaining ceramic tube H bottomed out against end 16 of metal tube B.

The temperature sensing probe of the present application may be used for cycling a heating element on and off to maintain a desired temperature, and for signaling a solenoid to lock a door on a self-cleaning oven.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A temperature sensing device comprising:
an elongated metal tube having opposite end portions;
a thermistor positioned within said tube adjacent one of said end portions;
a pair of wires extending into said tube at the other of said end portions thereof and being connected with said thermistor;
a ceramic tube interposed between said metal tube and said thermistor; and
said ceramic tube having a closed end adjacent said one end portion of said metal tube.

2. The device of claim 1 wherein said ceramic tube has an open end opposite said closed end thereof, and ceramic spacer means adjacent said open end for maintaining said pair of wires in spaced-apart relationship to one another and in spaced relationship to said metal tube.

3. The device of claim 2 wherein said ceramic tube has an inner surface and said spacer means maintains said wires in spaced-apart relationship lying closely adjacent said inner surface.

4. The device of claim 3 wherein said spacer means comprises a disc having a pair of spaced-apart holes therethrough and through which said wires extend.

5. A temperature sensing device comprising:

a metal tube having a substantially closed end and an open end;
a ceramic tube closely received in said metal tube for longitudinal sliding movement relative thereto and being bottomed out against said closed end of said metal tube;
a thermistor in said ceramic tube;
a pair of stiff wires extending into said tube through said open end thereof and being connected with said thermistor;
cooperating means between said wires and said ceramic tube for transferring a longitudinal pushing force from said wires to said ceramic tube in a direction toward said substantially closed end of said metal tube to slide said ceramic tube longitudinally against said substantially closed end of said metal tube; and
cooperating means between said metal tube and said wires for maintaining said ceramic tube bottomed out against said closed end of said metal tube by virtue of the stiffness of said wires.

6. A temperature sensing device comprising:
a metal tube having closed and open ends;
a ceramic tube having closed and open ends;
said ceramic tube being positioned within said metal tube with said closed end of said ceramic tube bottomed out against said closed end of said metal tube;
a thermistor in said ceramic tube adjacent said closed end thereof;
a pair of stiff wires extending into said metal tube through said open end thereof and being connected with said thermistor;
spacer means adjacent said open end of said ceramic tube for maintaining said pair of wires in spaced-apart relationship to one another and in spaced relationship to said metal tube; and
said stiff wires cooperating with said metal and ceramic tubes to hold same against longitudinal movement relative to one another.

7. A temperature sensing device comprising:
an elongated metal tube having opposite end portions;
a thermistor positioned within said tube adjacent one of said end portions;
a pair of wires extending into said tube at the other of said end portions thereof and being connected with said thermistor;
a ceramic tube interposed between said metal tube and said thermistor;
said one end portion of said metal tube having a substantially closed end;
said ceramic tube having a substantially closed end, bottomed out against said substantially closed end of said metal tube,
said pair of wires being stiff and being positioned for holding said ceramic tube against longitudinal movement within said metal tube; and
holding means for holding said wires against longitudinal movement relative to said metal tube.

8. The device of claim 7 wherein said holding means comprises a crimp in said metal tube that is crimped in clamping engagement with said wires.

9. A temperature sensing device comprising:
an elongated metal tube having opposite end portions;
a thermistor positioned entirely within said tube adjacent one of said end portions;

a pair of wires extending into said tube at the other of said end portions thereof and having wire end portions connected with said thermistor;

a ceramic tube interposed between said metal tube and said thermistor; and said ceramic tube having one open end through which said connected transistor and wire end portions are insertable into the same hollow space within said ceramic tube and having a substantially closed opposite end.

10. The device of claim 9 including ceramic spacer means adjacent said open end of said ceramic tube for maintaining said pair of wires in spaced-apart relationship to one another and in spaced relationship to said ceramic and metal tubes.

* * * * *